US008584138B2

(12) United States Patent
Sangili et al.

(10) Patent No.: US 8,584,138 B2
(45) Date of Patent: Nov. 12, 2013

(54) DIRECT SWITCHING OF SOFTWARE THREADS BY SELECTIVELY BYPASSING RUN QUEUE BASED ON SELECTION CRITERIA

(75) Inventors: Vasudevan Sangili, San Jose, CA (US); Edward J. Sharpe, Los Gatos, CA (US); Harshadrai Parekh, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1647 days.

(21) Appl. No.: 11/888,232

(22) Filed: Jul. 30, 2007

(65) Prior Publication Data

US 2009/0037927 A1 Feb. 5, 2009

(51) Int. Cl.
*G06F 9/46* (2006.01)
(52) U.S. Cl.
USPC .......................................................... 718/107
(58) Field of Classification Search
USPC ................. 718/102, 104, 105, 103, 108, 107
See application file for complete search history.

(56) References Cited

U.S. PATENT DOCUMENTS

| 5,515,538 | A  | * | 5/1996  | Kleiman ........................ 710/260 |
| 5,826,079 | A  | * | 10/1998 | Boland et al. ................. 718/102 |
| 7,076,781 | B2 | * | 7/2006  | Skovira ......................... 718/102 |
| 7,624,257 | B2 | * | 11/2009 | Kra ............................... 712/228 |
| 8,161,481 | B2 | * | 4/2012  | May .............................. 718/102 |
| 2004/0187120 | A1 | * | 9/2004 | Moore et al. ................. 718/100 |
| 2006/0130062 | A1 | * | 6/2006 | Burdick et al. ............... 718/100 |
| 2007/0061521 | A1 |   | 3/2007 | Kelly et al. |
| 2007/0101333 | A1 | * | 5/2007 | Mewhinney et al. ......... 718/102 |
| 2009/0007123 | A1 | * | 1/2009 | Sreedharan et al. .......... 718/103 |

OTHER PUBLICATIONS

Gil et al., "The Enhancement of a User-level Thread Package Scheduling on Multiprocessors", 1994.*

* cited by examiner

*Primary Examiner* — Meng An
*Assistant Examiner* — Brian Chew

(57) ABSTRACT

An embodiment of the invention provides an apparatus and a method for direct switching of software threads. The apparatus and method include performing acts including: issuing a wakeup call from a first thread to a second thread in a sleep state; removing the second thread from the sleep state; switching out the first thread from the resource; switching in the second thread to the resource; and running the second thread on the resource.

17 Claims, 4 Drawing Sheets

DIRECT SWITCHING OF SOFTWARE THREADS BY SELECTIVELY BYPASSING RUN QUEUE BASED ON SELECTION CRITERIA

TECHNICAL FIELD

Embodiments of the invention relate generally to an apparatus and method for direct switching of software threads.

BACKGROUND

A software thread is a stream of instructions that are to be executed by a processor. As known to those skilled in the art, when a software thread is placed in a sleep state, the thread is deactivated by a scheduler and the thread is then re-activated when a given external event occurs such as, for example, the expiration of the sleep time period or when a currently running thread issues a wakeup call to the sleeping thread. Note that in other systems, the "sleep state" is alternatively called a "waiting state" or "suspended state". In the sleep state, the thread is typically placed in a queue ("sleep queue") of threads waiting for a lock (i.e., synchronization object). When a thread is placed in the sleep state, the thread does not consume a significant amount of processor time. A lock is associated with a shared resource (e.g., a CPU core) so that other threads will be blocked from accessing the shared resource until a currently running thread has completed its operation in the shared resource and has released the lock.

When a particular thread has to wait for a shared resource because a currently running thread is using that shared resource, the particular thread will go into the sleep state. When the resource becomes available because the currently running thread has released the lock for the resource, the currently running thread will issue a wake-up call to the sleeping thread (i.e., the thread in a sleep state). When the sleeping thread is woken up, the scheduler places the woken-up thread on a run queue. The scheduler can then pick up the woken-up thread in the run queue and execute that thread. However, this woken-up thread is unable to run at least until a currently running thread on the processor is switched out by the scheduler. The wait time for this woken-up thread to run may vary, depending on the run queue load (i.e., the number of threads that are ahead of the woken-up thread in the run queue) and the relative priorities of the threads that are already in the run queue.

One problem that may occur is that a resource may be available (i.e., the resource is in an unlocked-state) for use by threads, but only the woken-up thread is permitted to acquire this available resource. No other thread other than the woken-up thread can acquire this resource. As mentioned above, this woken-up thread may also be waiting in the run queue and waiting its turn to run until other appropriate threads in the queue have run. In this circumstance, it is important that the woken-up thread runs as soon as possible and use the resource that only the woken-up thread can acquire, so that unnecessary contention on that resource by threads and wasted CPU (central processing unit) consumption are reduced. For example, this additional contention is due to the woken-up thread contending with other threads for a global lock before the woken-up thread can obtain a resource-specific lock for that resource. Current approaches do not provide a solution to the above-discussed problem. For example, one possible approach is to increase the priority of the woken-up thread so that the wait time in the run queue of the woken-up thread is reduced. However, this approach is expensive in terms of additional hardware and software overhead, and does not always lead to a significant reduction in the wait time in the run queue of the woken-up thread.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
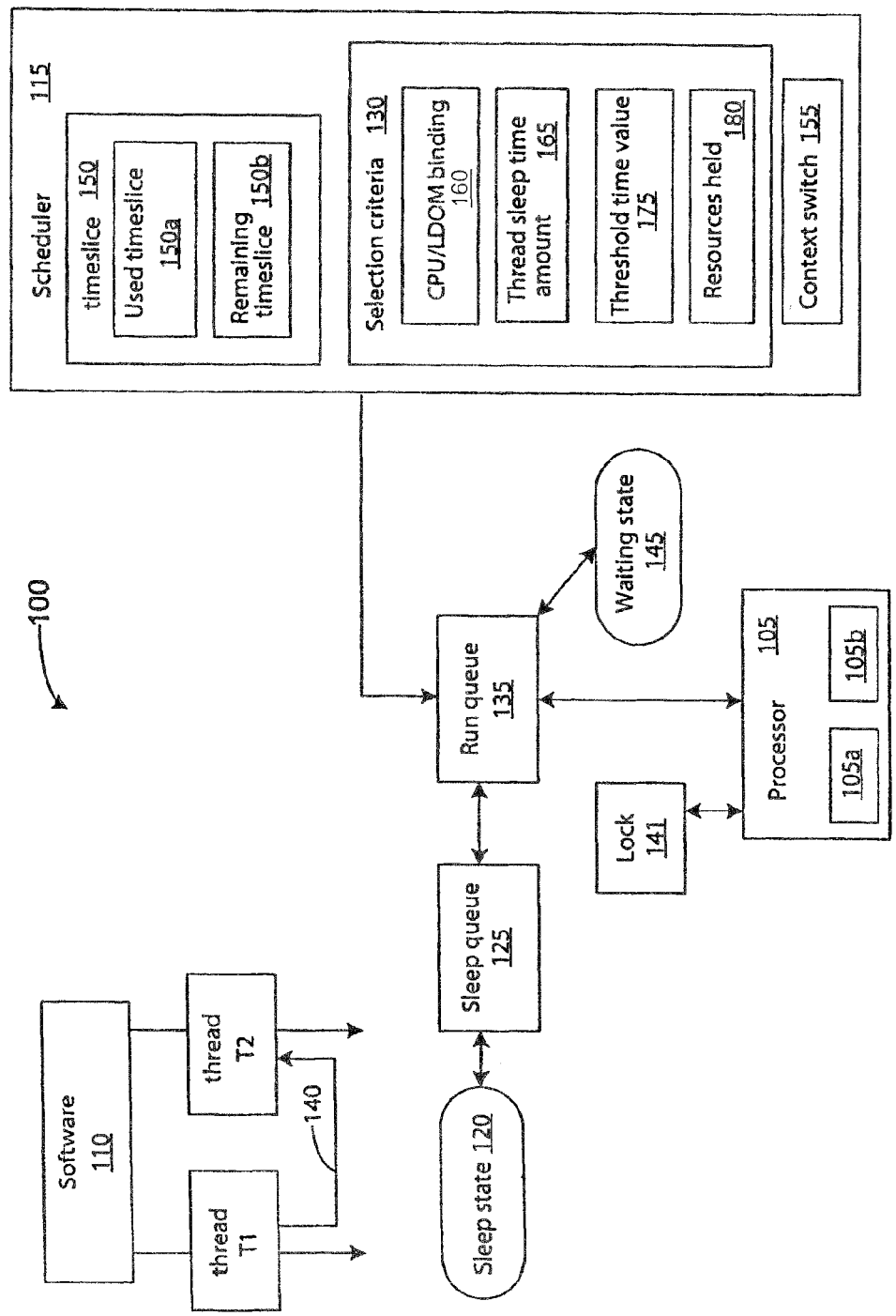
FIG. 1 is a block diagram of an apparatus (system) in accordance with an embodiment of the invention.

FIG. 1 is a block diagram of an apparatus (system) 100 in accordance with an embodiment of the invention. The apparatus 100 can be implemented in, for example, a computer system. For purposes of discussing the details of an embodiment of the invention, the software threads T1 and T2 are used as examples. The software threads T1 and T2 are streams of instructions that are to be executed by a processor 105 for a software 110. If the processor 105 is a multi-core processor, then a core (e.g., core 105*a* or 105*b*) of the processor 105 will execute at least one of the threads T1 and T2. In another example, the thread T2 may be a thread of a software that is different from the software 110. The number of threads associated with a software and the number of software in the system 100 may vary.

A scheduler 115 can place any software thread in a sleep state 120 when the scheduler 115 places the thread in the sleep queue 125. When a thread is sleeping (i.e., is in the sleep state 120), the thread is deactivated by the scheduler and the thread is then re-activated when a given external event occurs such as, for example, the expiration of the sleep time period or when a currently running thread issues a wakeup call to the sleeping thread. When a thread is placed in the sleep state 120, the thread does not consume a significant amount of processor time.

The scheduler 115 can be implemented by, for example, use of known programming languages such as, e.g., C or C++, and can be programmed by use of standard programming techniques.

An embodiment of the invention provides a system (apparatus) 100 to run a woken-up software thread immediately by directly switching to the woken-up thread and the decision to directly switch the woken-up thread is based on a selection criteria 130, as discussed further below. As a result, this directly switched in thread (e.g., thread T2 in the example below) is not placed in the run queue 135. Therefore, the system 100 advantageously reduces the prior latency between the time when a software thread is placed on a run queue 135 (from the sleep queue 125) and the time when the software thread will run on a processor 105 (or processor core 105a or 105b). In cases where only the woken-up thread can acquire a particular resource, an embodiment of the invention advantageously reduces the unnecessary contention on that resource by threads and wasted CPU consumption due to the unnecessary contention.

As an example, assume that the threads T1 and T2 are to run on the processor 105. In this example, assume that the threads T1 and T2 are to run on the processor core 105a. If thread T1 is first running on the core 105a, then the scheduler 115 will place the thread T2 in the sleep queue 125 because thread T2 is waiting for a resource (i.e., core 105a) that is currently not available to the thread T2.

When the thread T1 has finished working on a resource and has released a lock (mutex) 141 for the core 105a, the thread T1 will issue a standard wakeup call 140 in a conventional manner to the thread T2, when thread T1 releases the lock 141 for the core 105a. The scheduler 115 detects the wakeup call 140. In response to the detection of the wakeup call 140, the scheduler 115 will remove the woken-up thread T2 from the sleep queue 125.

As previously discussed above, in prior systems, the thread T2 is placed in the run queue 135 in a waiting state 145 and will start running on the available resource (e.g., core 105a) when the thread T2 becomes the most eligible thread on the run queue 135. Therefore, other threads that are ahead of the woken-up thread T2 in the run queue 135 and higher priority threads in the run queue 135 will run before a scheduler 115 will pick up the thread T2 to allow the thread T2 to start running on the core 105a.

In an embodiment of the system 100, when the thread T2 is woken up and removed from the sleep queue 125, the scheduler 115 applies a set of selection criteria 130 in order to determine if the thread T2 is eligible for direct switching into the resource that thread T2 is waiting on, so that the thread T2 will immediately run on the resource (e.g., core 105a).

If the woken-up thread T2 is eligible for direct switching, the scheduler 115 will directly switch the running thread T1 with the woken-up thread T2. Typically, a context switch module 155 in the scheduler 115 performs a context switch so that the thread T1 is switched out of the core 105a and the thread T2 is directly switched in the core 105a from the sleep queue 125. As known to those skilled in the art, a context switch is a computing process of permitting multiple processes or threads to share a single CPU resource. The specific steps that are performed by the context switch module 155 during a context switch are well known to those skilled in the art. In a context switch, the state of a first thread is saved, so that when the scheduler gets back to the execution of the first thread, the scheduler can restore this state and continue normally. The state of the thread includes, for example, all the registers that the thread may be using and any other operating system specific data that are used by the thread.

As a result of this direct switching, the thread T1 that is issuing the wakeup call 140 is placed by the scheduler 115 on the run queue 135 before switching to the woken-up thread T2. The thread T1 is place on the run queue 135 because this placement is only the next logical transition for T1 (i.e., T1 cannot be placed in a sleep queue). When the scheduler 115 directly switches the woken-up thread T2, the thread T2 will then run on the core 105a. Additionally, when the thread T2 is switched in, the thread T2 will then run even if there are other threads (in run queue 135) with a higher priority than the priority of thread T2.

The thread T2, which has been switched in, will typically only be given the remaining timeslice of the switched-out thread T1 to run on the core 105a, so that the scheduler 115 can still comply within the POSIX (Portable Operating System Interface) boundaries. As known to those skilled in the art, POSIX is a set of standard operating system interfaces based on the UNIX operating system. Therefore, for a timeslice value 150 that the thread T1 is permitted to use when running on the core 105a, the used timeslice 105a is the actual time that the thread T1 has already spent running on the core 105a and the remaining timeslice 105b is the remaining time in the timeslice value 105 that has not been used by the thread T1 while running on the core 105a. The thread T2 will then run on the core 105a for the duration of the remaining timeslice 150b, instead of running for the entire time length of the scheduler timeslice 150. The used timeslice 105a and remaining timeslice 105b are time values that are typically tracked by the scheduler 115.

In an embodiment, the selection criteria includes a CPU binding or/and locality-domain (LDOM) binding of the thread (generally shown as binding 160, the amount 165 of time the thread has been sleeping, and/or resources held attributes 180. The binding 160 contains data structure that indicates the processor or locality domain that a thread is bounded to and will run in. Locality domains are discussed in further details in commonly-assigned U.S. patent application Ser. Nos. 11/104,024 and 11/224,849. U.S. patent application Ser. Nos. 11/104,024 and 11/224,849 are hereby fully incorporated herein by reference.

The resources held attributes 180 tracks the resources that are held by the threads and resources that the threads are trying to obtain. The example in FIG. 3 below discusses how the scheduler 115 uses this attributes 180 to determine if a woken-up thread in the sleep queue 125 should be directly switched into the resource according to the manner discussed above.

Figure 2:
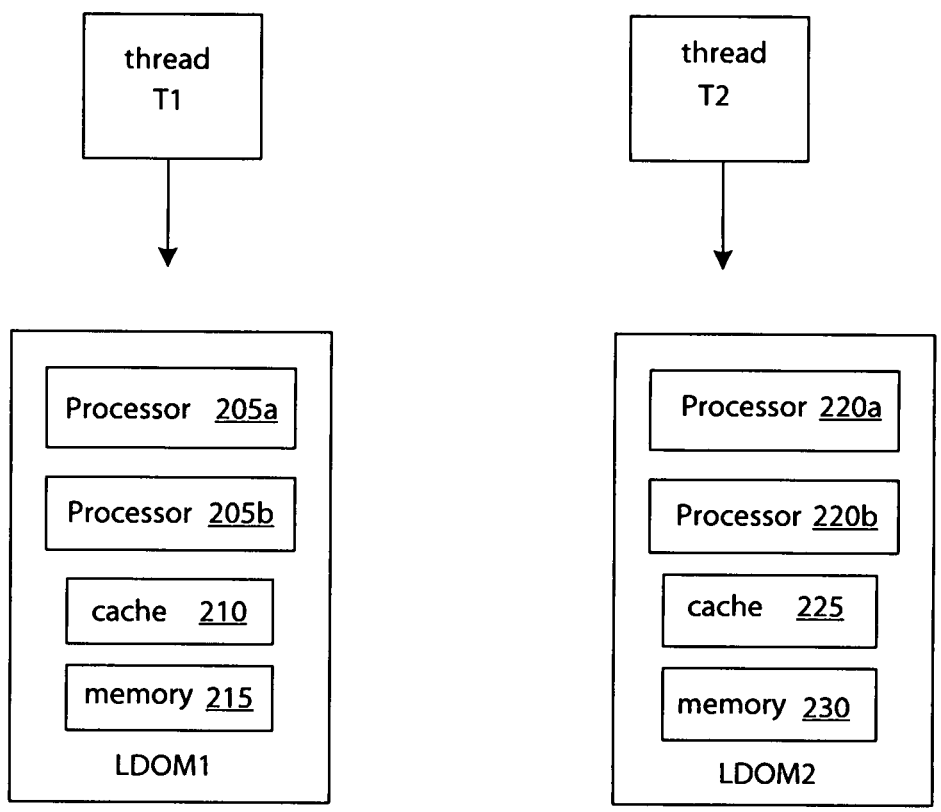
FIG. 2 is a block diagram illustrating the locality domain bindings of threads that are checked by an embodiment of the invention.

Reference is now made to FIGS. 1 and 2 for discussing an example operation of the system 100. As mentioned above, the scheduler 115 checks the selection criteria 130 to determine if it should switch out thread T1 and switch in thread T2 to a resource (e.g., core 105a). As an example, assume that a first locality domain LDOM1 has processors 205a and 205b, cache 210, and memory 215. Additional details of locality domains are discussed in the above cited commonly-assigned U.S. patent application Ser. Nos. 11/104,024 and 11/224,849. A second locality domain LDOM2 has processors 220a and 220b, cache 225, and memory 230. As an example, if thread T1 is bound to LDOM1, then the thread T1 will populate data into the cache 210 or 215, where this populated data is needed or used by the running thread T1.

As an example, if threads T1 and T2 are both bound to the same locality domain LDOM1, then the scheduler 115 will directly switch out thread T1 and switch in thread T2 to a resource (e.g., core 105a) after the scheduler 115 detects the wakeup call 140 (FIG. 1). Therefore, if no other thread can obtain the resource 105a (other than threads T1 and T2), then the thread T2 will be able to immediately use the resource 105a even if there are other threads in run queue 135) where these other threads have a higher priority than the thread T2. As a result of thread T2 being able to obtain the resource 105a that other threads cannot use, the direct switching of thread T2 to run on the resource 105a will reduce the unnecessary contention on that resource 105a by other threads and wasted CPU consumption due to the unnecessary contention.

As another example, if thread T1 is bound to LODM1 and thread T2 is bound to LDOM2, then the scheduler 115 will directly switch out thread T1 and switch in thread T2 to a particular resource in LDOM 2 (e.g., processor 220a or 220b) after the scheduler 115 detects the wakeup call 140 (FIG. 1) and if a time amount (e.g., stored in value 165 in FIG. 1) that the thread T2 has been sleeping has exceeded a preset threshold time value 175 (FIG. 1). Therefore, if no other thread can obtain a particular resource in LDOM 2 except thread T2, then the thread T2 will be able to immediately use that LDOM2 resource if the sleep time of thread T2 has exceed the threshold time value 175. If the sleep time of thread T2 has not exceeded the threshold time value 175, then the scheduler 115 will not directly switch in the thread T2 to run on the LDOM2 resource. If this occurs, the thread T2 will be placed in the run queue 135.

One reason to not switch out T1 and switch in T2 if they are bound to different locality domains is the associated cost of transferring thread data between the locality domains. However, if the sleep time of a thread has exceeded the threshold time value 175, then this cost of transferring the thread data between locality domains becomes less significant because other activities in the system 100 may have likely flushed thread data from the locality domains, and as a result, the thread T2 will have to re-populate the thread data into the cache or memory in LDOM2. Therefore, the comparison between the thread sleep time amount 165 and threshold time value 175 permits compliance with processor/LDOM(cell) binding of threads.

The threshold time value 175 can be set to a value of, for example, 2 ticks (cycles), but can be also be adjusted or set to other values. A factor to consider when setting the time value 175 is cache affinity (i.e., the LDOM in which a thread is assigned). For example, if thread T2 still has some data on processor 205a in LDOM1, there may be some performance degradation (as also noted above) by switching-in thread T2 to processor 220a in LDOM2.

Figure 3:
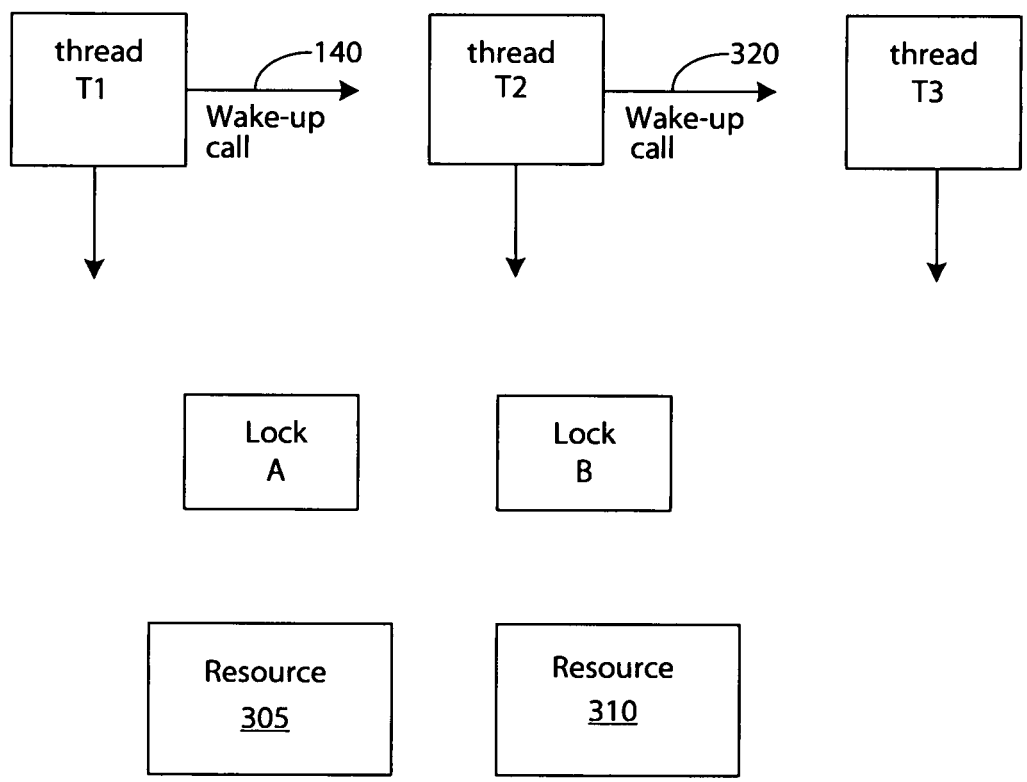
FIG. 3 is a block diagram illustrating the contention of multiple software threads on resources.

FIG. 3 is a block diagram illustrating the contention of multiple software threads on resources. In this example, assume that thread T1 is currently holding the lock A (mutex) and thread T2 is waiting to obtain the lock A. The scheduler 115 determines this condition by checking the attributes 180 (FIG. 1). When the thread T1 releases the lock A, the thread T1 sends the wake-up call 140 to thread T2, and the scheduler 115 will directly switch in the thread T2 from the sleep queue 125. The woken-up thread T2 can then run immediately on the resource 305 that is guarded by the lock A. As mentioned above, the woken-up thread T2 is directly switched in to run on the resource 305 and is not placed in the run queue 135. Therefore, this direct switching into the resource of the thread T2 advantageously avoids the run queue overhead of previous systems since the thread T2 is not subject to the latency of waiting in the run queue, and avoids contention in the kernel by threads on a lock of the run queue 135. The thread T2 immediately acquires the resource (e.g., a CPU) which leads to an optimal use of CPU resources. Since the thread T2 is not placed in a run queue, the system 100 advantageously avoids the starvation of threads that are already sitting in the run queue 135. As known to those skilled in the art, thread starvation occurs when a thread is unable to obtain a resource that the thread is waiting to obtain.

As another example, assume that thread T1 is currently holding the lock A and lock B. Lock A and lock B are used to guard the same resource 305 or lock B is used to guard a different resource 310. Thread T2 is waiting to obtain the lock A. When the thread T1 releases the lock A, the thread T1 sends the wake-up call 140 to thread T2. However, thread T1 has not yet released the lock B which other threads (e.g., thread T3) are waiting to obtain. The scheduler 115 will not directly switch in the thread T2 from the sleep queue 125 so that the thread T1 can continue its work on resource 310 and then give up the resource 310 to the other threads (e.g., thread T3) that are waiting to obtain the resource 310.

As another example with continuing reference to FIG. 3, assume that thread T1 is holding lock A and thread T2 is holding lock B. Thread T3 is waiting to obtain lock B and thread T2 is waiting to obtain lock A. When thread T1 releases lock A, thread T1 issues the wakeup call 140 to thread T2 and the scheduler 115 can immediately switch in the thread T2 to obtain lock A, subject to the selection criteria set 130 that are discussed above. When thread T2 has given up lock B, thread T2 issues the wakeup call 320 to the thread T3, and the scheduler 115 can immediately switch in the thread T3 to obtain the lock B, subject to the selection criteria set 130 that are discussed above. Therefore, in a system with multiple threads that are waiting on various resources, the direct switching into resources of the threads reduces the latency and leads to performance improvement. Based on the use of the above selection criteria 130 in the various examples above to determine whether or not to switch in a woken-up thread, there is typically seen, for example, approximately 37% performance improvement in throughput based on a given multithreaded mutex benchmark.

Figure 4:
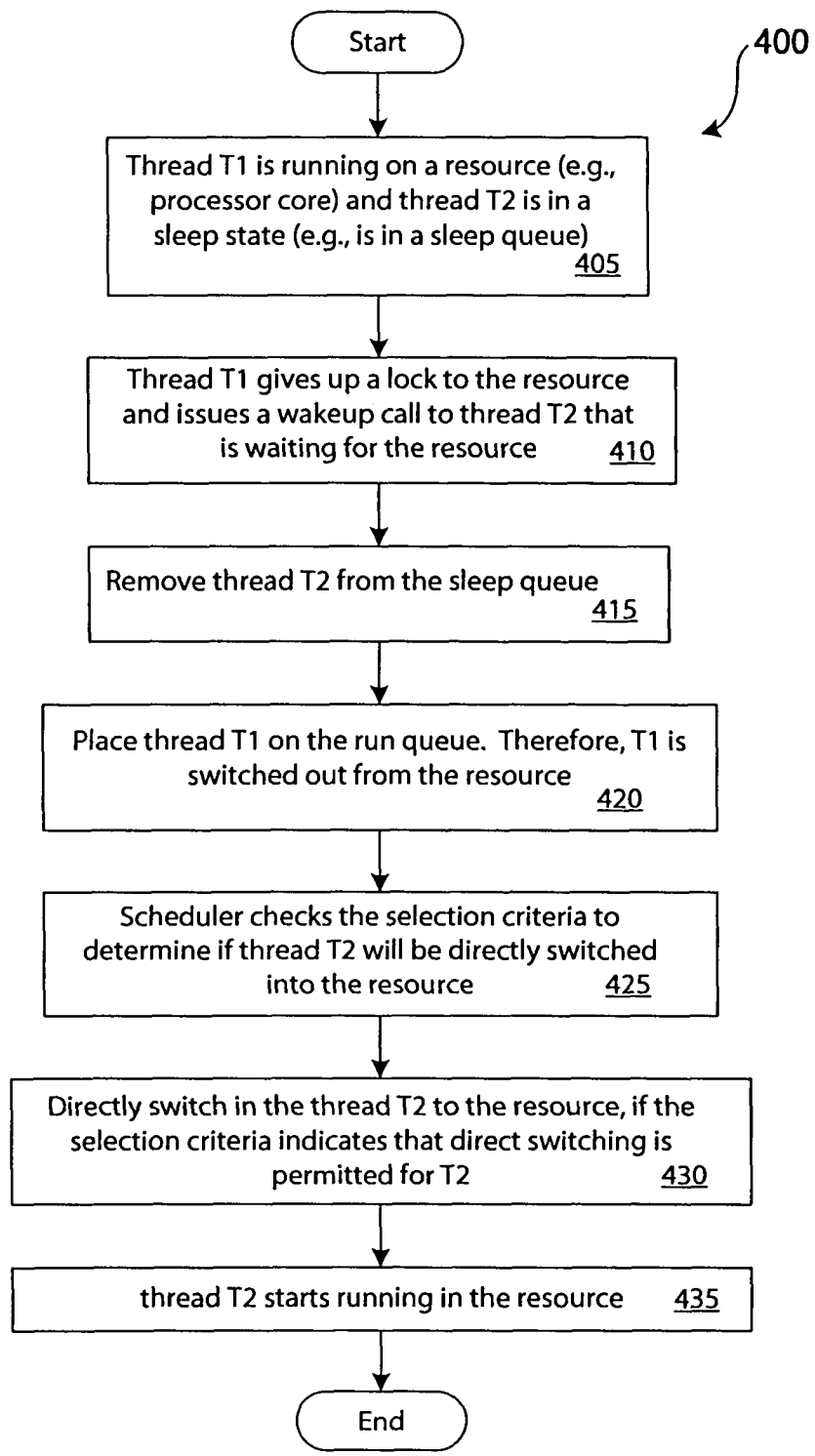
FIG. 4 is a flow diagram of a method in accordance with an embodiment of the invention.

FIG. 4 is a flow diagram of a method 400 in accordance with an embodiment of the invention. In block 405, the thread t1 is running on a resource (e.g., a processor core) and thread T2 is in a sleep state (e.g., thread T2 is in a sleep queue).

In block 410, thread T1 gives up a lock on the resource and issues a wakeup call to the thread T2 that is waiting for the resource.

In block 415, the scheduler 115 removes the thread T2 from the sleep queue.

In block 420, the scheduler 115 places the thread T1 on the run queue. Therefore, thread T1 is switched out from the resource.

In block 425, the scheduler 115 checks the selection criteria 130 to determine if the thread T2 will be directly switched into the resource. Therefore, the selection criteria 130 indicate if direct switching of the thread T2 into the resource is permissible.

In block 430, the scheduler 115 directly switches in the thread T2 to the resource, if the selection criteria 130 indicate that direct switching is permitted for the thread T2.

In block 435, the thread T2 starts running on the resource.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
providing a run queue to establish an order for a scheduler to schedule software threads for execution;
using a first thread to work on a resource;
using the first thread to issue a wakeup call to a second thread that is in a sleep state in a sleep queue;
removing the second thread from the sleep state;
switching out the first thread from working on the resource;
checking predetermined selection criteria to determine if direct switching of the second thread into the resource is permissible;
using the wakeup call to trigger the scheduler to selectively bypass the ordering established by the run queue and switch in the second thread to allow the second thread to work on the resource based on the predetermined selection criteria; and
running the second thread on the resource for a remaining timeslice value that is not used by the first thread.

2. The method of claim 1, wherein the switching out the first thread comprises: placing the first thread in the run queue.

3. The method of claim 1, further comprising:
checking the selection criteria to determine if direct switching of the second thread into the resource is permissible.

4. The method of claim 1, wherein the resource comprises a processor resource.

5. The method of claim 1, further comprising:
switching out the first thread and switching in the second thread to the resource if the first thread and second thread are bound to a same locality domain.

6. The method of claim 1, further comprising:
switching out the first thread and switching in the second thread to the resource if the first thread and second thread are bound to different locality domains and the second thread has been in the sleep state beyond a threshold time value.

7. The method of claim 1, further comprising:
avoiding in switching out the first thread and avoiding in switching in the second thread to the resource if the first thread and second thread are bound to different locality domains and the second thread has not been in the sleep state beyond a threshold time value.

8. The method of claim 1, further comprising:
switching out the first thread and switching in the second thread to the resource based on particular resources held by the first thread and resources that the second thread is waiting to obtain.

9. An apparatus comprising:
a processor;
a run queue to establish an order to execute software threads;
a first thread to work on a resource;
a second thread, to be placed in a sleep state in a sleep queue and being issued a wakeup call by the first thread; and
a scheduler configured to, in direct response to the wakeup call, remove the second thread from the sleep state, switch out the first thread from working on the resource, check the selection criteria to determine if direct switching of the second thread into the resource is permissible, selectively bypass the ordering established by the run queue, and switch in the second thread to allow the second thread to work on the resource based on the predetermined selection criteria,
wherein the second thread is configured to run on the resource for a remaining timeslice value that is not used by the first thread.

10. The apparatus of claim 9, wherein the scheduler is configured to switch out the first thread by placing the first thread in the run queue.

11. The apparatus of claim 9, wherein the resource comprises a processor resource.

12. The apparatus of claim 9, wherein the scheduler is configured to switch out the first thread and switch in the second thread to the resource if the first thread and second thread are bound to a same locality domain.

13. The apparatus of claim 9, wherein the scheduler is configured to switch out the first thread and switch in the second thread to the resource if the first thread and second thread are bound to different locality domains and the second thread has been in the sleep state beyond a threshold time value.

14. The apparatus of claim 9, wherein the scheduler is configured to avoid in switching out the first thread and avoid in switching in the second thread to the resource if the first thread and second thread are bound to different locality domains and the second thread has not been in the sleep state beyond a threshold time value.

15. The apparatus of claim 9, wherein the scheduler is configured to switch out the first thread and switch in the second thread to the resource based on particular resources held by the first thread and resources that the second thread is waiting to obtain.

16. An apparatus for direct switching of software threads, the apparatus comprising:
a processor;
means for providing a run queue to establish an order for a scheduler to schedule software threads for execution;
means for using a first thread to work on a resource;
means for using the first thread to issue a wakeup call to a second thread that is in a sleep state in a sleep queue;
means for removing the second thread from the sleep state;
means for switching out the first thread from working on the resource;
means for using the scheduler to directly respond to the wakeup call by checking a selection criteria to determine if direct switching of the second thread into the resource is permissible, selectively bypassing the ordering established by the run queue and switching in the second thread to allow the second thread to work on the resource based on the predetermined selection criteria; and
means for running the second thread on the resource for a remaining timeslice value that is not used by the first thread.

17. An article of manufacture comprising:
a machine-readable non-transitory storage medium having stored thereon instructions to when executed by at least one processor cause said at least one processor to:
provide a run queue to establish an order for a scheduler to schedule software threads for execution;
use a first thread to work on a resource;
use the first thread to issue a wakeup call to a second thread that is in a sleep state in a sleep queue;
remove the second thread from the sleep state;
switch out the first thread from working on the resource;

check predetermined selection criteria to determine if direct switching of the second thread into the resource is permissible;
use the wakeup call to trigger the scheduler to selectively bypass the ordering established by the run queue and switch in the second thread to allow the second thread to work on the resource based on the predetermined selection criteria; and
run the second thread on the resource for a remaining timeslice value that is not used by the first thread.

* * * * *